(No Model.) 3 Sheets—Sheet 1.
W. J. ENGLEDUE.
GALVANIC BATTERY.
No. 481,664. Patented Aug. 30, 1892.
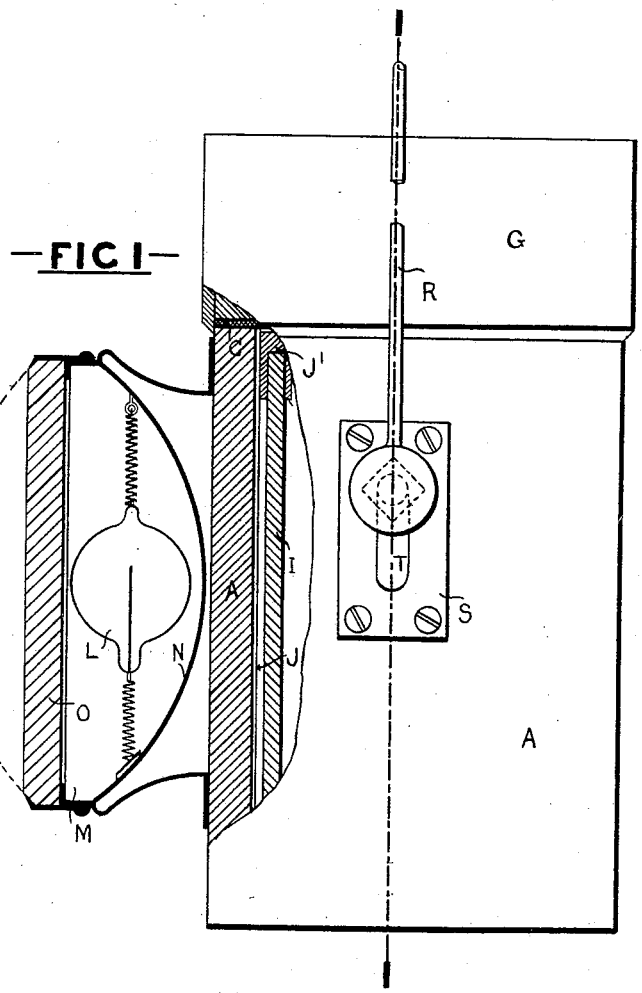
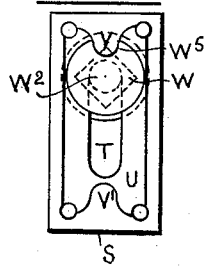
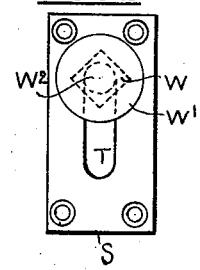
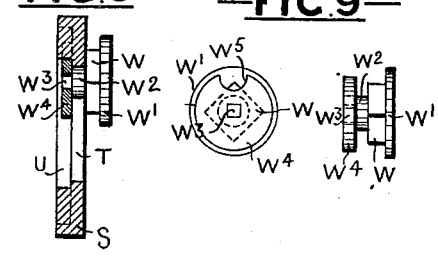
WITNESSES
INVENTOR.
William John Engledue (No Model.) 3 Sheets—Sheet 2.

W. J. ENGLEDUE.
GALVANIC BATTERY.

No. 481,664. Patented Aug. 30, 1892.

WITNESSES
INVENTOR (No Model.) 3 Sheets—Sheet 3.
W. J. ENGLEDUE.
GALVANIC BATTERY.
No. 481,664. Patented Aug. 30, 1892.
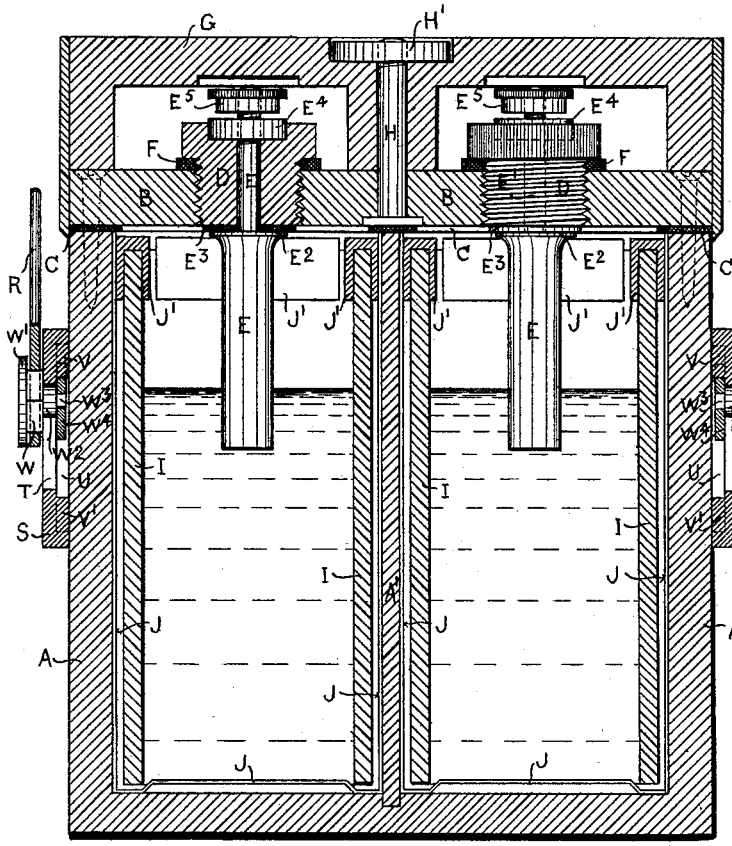
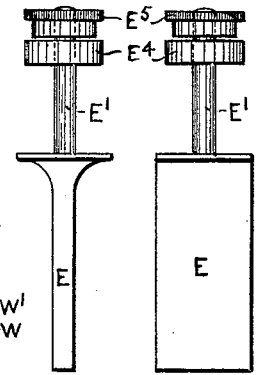
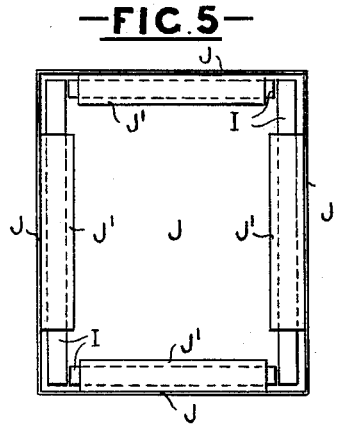
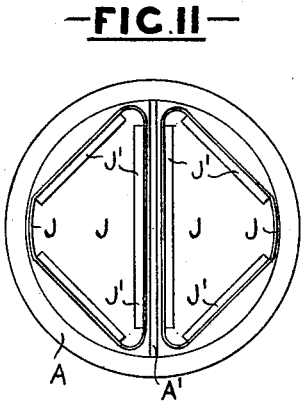
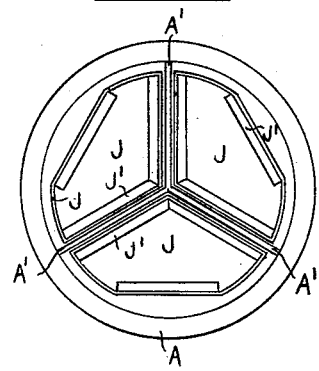
WITNESSES
INVENTOR
William John Engledue

UNITED STATES PATENT OFFICE.

WILLIAM JOHN ENGLEDUE, OF BYFLEET, ENGLAND.

GALVANIC BATTERY.

SPECIFICATION forming part of Letters Patent No. 481,664, dated August 30, 1892.

Application filed March 23, 1892. Serial No. 426,169. (No model.)

*To all whom it may concern:*

Be it known that I, WILLIAM JOHN ENGLE-DUE, lately a colonel in the Corps of Royal Engineers, and a subject of the Queen of Great Britain, residing at Petersham Place, Byfleet, in the county of Surrey and Kingdom of Great Britain, have invented a certain new and useful Improvement in Galvanic Batteries, of which the following is a specification.

This invention relates to an improvement in galvanic batteries employed for the production of electric light in miners' lamps, or for other purposes where it is required to maintain the current more generally constant than can be insured by any other means heretofore in use. I provide the battery with a top or cover which can be clamped liquid-tight thereto by means of an india-rubber or other suitable elastic ring or jointing washer, so that the battery may be inverted without escape of the electrolytic fluid, and I fill the battery with the electrolytic fluid to such a height only as will cause a part, but not the whole, of the elements or electrodes to be immersed therein. After use of the battery in its normal position until the current has fallen below what is requisite for producing the desired efficient result, whether for producing an electric light in a miner's lamp or other purpose, the battery is inverted and a larger or a different portion of the elements or electrodes then becomes immersed, exposing a larger surface of such elements or electrodes or of one of such elements or electrodes to the action of the weakened electrolytic fluid, thereby restoring the current more or less nearly to what it was at first. By these means a more constant current can be produced than has been heretofore practicable without restoring the strength of the electrolytic fluid as it becomes weaker.

In order that my said invention may be fully understood, I will now proceed to describe the same with the aid of the accompanying three sheets of drawings, in which—

Figure 2:
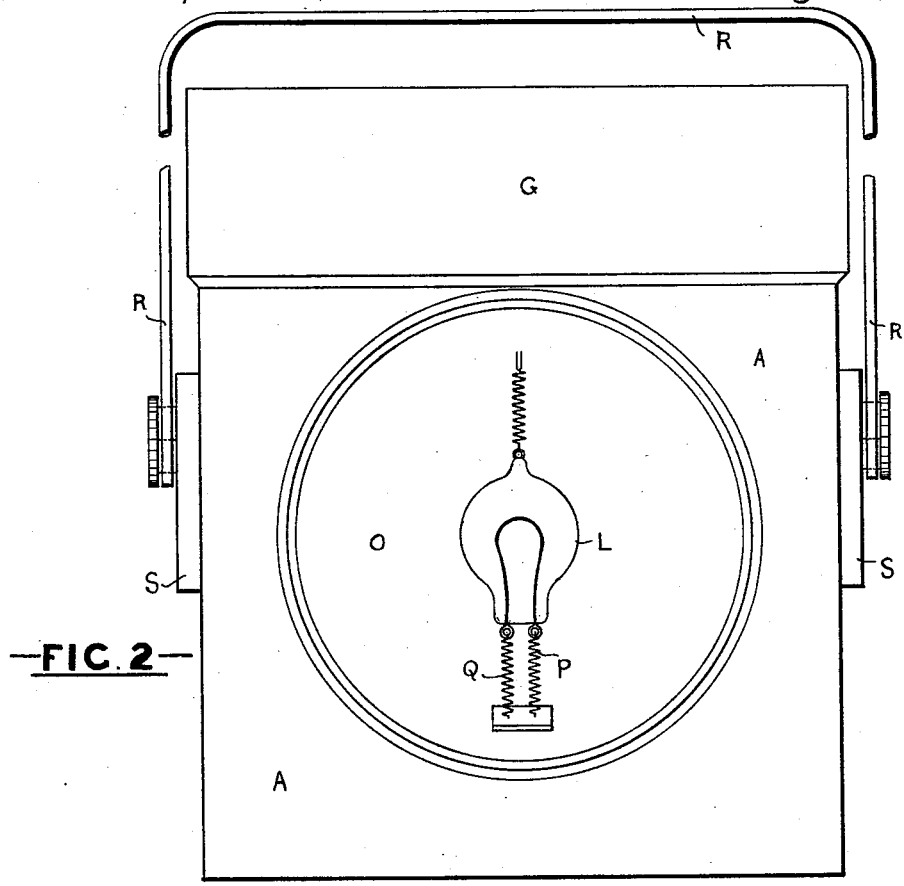
Figure 3:
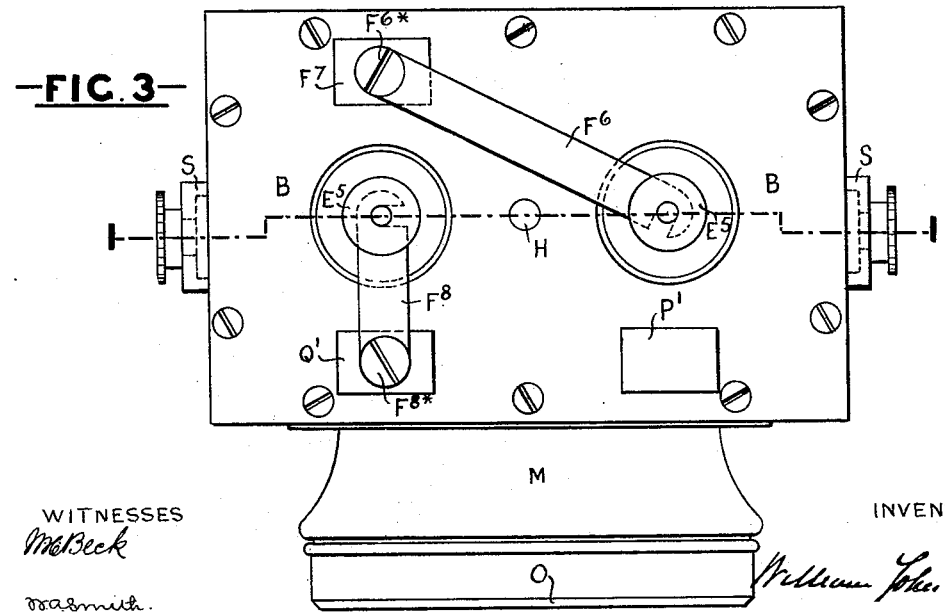

Figure 1 is a side elevation partly in section, Fig. 2 a front elevation, Fig. 3 a plan, and Fig. 4 a vertical sectional elevation taken on line 1 1 of Figs. 1 and 3, of a two-cell galvanic battery constructed in accordance with my invention and adapted to the purpose of producing an electric light in a miner's or other lamp or lantern. Figs. 5, 6, 7, 8, 9, and 10 are detail views of certain parts, and Figs. 11 and 12 show modified forms and arrangements of the apparatus.

A is the case or body of the battery, divided into two separate compartments or cells by a partition $A'$. This case or body may be made of wood lined with cement in the usual well-known way, or of ebonite or other suitable material.

B is a top or cover plate of ebonite, vulcanized fiber, woodite, or other suitable material, secured to the top of the case A by screws or otherwise, and jointed liquid-tight thereto and to the partition $A'$ by means of the india-rubber or other suitable elastic ring or jointing-washer C, so that when the battery is inverted the electrolytic fluid cannot escape therefrom or form a communication from one cell to another. This top or cover B has a hole formed through it above the center, or thereabout, of each cell. Each of these holes is tapped with a screw-thread and has screwed into it a screwed bush D of ebonite, for example, forming a holder for the zinc or other positive electrode or element E. An india-rubber washer F is interposed between the flange of the holder D and the top or cover B, in order to make a perfectly liquid-tight joint between the two. The zinc or other positive element E is formed with a screwed stem $E'$, which passes through a hole in the holder D, and with a shoulder $E^2$, which bears against an india-rubber or other suitable elastic washer $E^3$, forming a liquid-tight joint with the under side of the holder D when the zinc E is tightened up in place by the countersunk nut $E^4$. By these means the battery is hermetically closed, so that it can be inverted without any of the electrolytic fluid escaping therefrom. The nuts $E^5$ are for securing the connecting-slips $F^6$ $F^8$ in place, so as to make metallic contact with the positive elements E when the battery is to be set to work. When it is required to renew the positive electrodes E, it is only necessary to unscrew the bushes or holders D from the cover-plate B to remove the old or worn-out electrodes from the said bushes or holders to insert new ones and then to screw the bushes or holders with the new electrodes into place again in the cover-plate B. G is a movable cover to protect the parts above the cover-plate B. It is normally held in position by the bolt H and nut H'.

I are the carbon or other negative elements. They may be arranged and held in position in any suitable or convenient way; but I prefer to mount them in a kind of case or frame J of sheet lead, the upper part of which has secured thereto by burning or soldering the lead clips or rabbets J' for holding in place the upper ends of the carbon or other negative plates I. These plates are preferably secured to the lead case or frame or to the clips or rabbets J' thereof by soldering or by casting the said rabbets or the frame, or both, on the said plates.

L is the incandescent electric lamp placed in a chamber M, secured to the front of the battery-case A and provided with a reflector N and glass front O. The latter may be of any desired shape, such as flat, as shown in full lines, or as a plano-convex lens or bull's-eye, as shown by the dotted line at O'.

P is a conductor connecting one end of the carbon filament of the lamp L through the contact-plate P' with the negative element I of one cell, and Q is a conductor connecting the other end of the said filament through the contact-plate Q' with the positive element E of the other cell. The slip $F^6$ is provided to complete the connection between the positive element of the first cell and the contact-plate $F^7$ of the negative element of the second, and the slip $F^8$ to complete the connection between the positive element of the second cell and the contact-plate Q' of the conductor Q. These slips can be turned on their respective pivots $F^{6*}$ $F^{8*}$, so as to make or break these connections at pleasure. It will now be understood that with the battery arranged as shown in the drawings and the electrolytic fluid having been previously introduced into the two cells through the openings in the cover-plate B, (the bushes D having been removed for that purpose and replaced after the fluid has been introduced,) so as to stand at about the level shown in Fig. 4, the electrodes E and I are only partly immersed in such liquid, but to a sufficient extent to produce incandescence in the lamp L for a certain time, at the end of which the electrolyte will have become so weakened that the illuminating power of the lamp will have become reduced. When this occurs, the battery is to be inverted and the electrolytic fluid will then come into contact with a fresh, larger, and more effective surface of the electrodes than before, and such increased effective surface will compensate (more or less) for the weakening of the electrolyte, and the illuminating power of the lamp will be restored (more or less) until the fluid has become still weaker and again insufficient to maintain the illuminating power to the proper extent, when a fresh supply of fluid must be provided.

In order to lock the handle R in position when the battery is carried by it either in its normal or in its inverted position, the following arrangements (shown more especially in Figs. 1, 2, 3, 4, 6, 7, 8, and 9) may be employed:

S are metallic plates, secured one at each side of the battery. Each plate is furnished with a slot T and a recess U, the latter provided with projecting parts V V'.

W is a pin of square or other suitable section, which takes into a correspondingly-shaped hole in the end of the handle R, so that the said pin is caused to turn along with the said handle. This pin is provided, first, with a head W' to prevent the handle R from coming off; secondly, with a cylindrical part $W^2$, which passes through the slot T and is free to turn and to be moved up or down therein; thirdly, of a square part $W^3$, and, fourthly, of a washer or disk $W^4$, passed onto the said square part $W^3$ and riveted thereon. The washer or disk $W^4$ takes into the recess U of the plate S, and has a notch $W^5$ formed in it and adapted to engage with the projection V or V' of the plate S. When the battery is being carried by the handle R in the normal position, as shown in the figures, the pin W is at the top of the slot T, with the notch $W^5$ in the disk $W^4$ engaged with the upper projection V. This brings the center of gravity of the battery and lamp below the points of suspension V, so that there is no tendency for the battery and lamp to turn over, and they are locked to the handle R, so that they cannot oscillate on the pins W. When the battery is being carried by the handle in the reversed position, the pin W passes to the other end of the slot T, and the notch $W^5$ takes over the projection V' and the handle R, and the battery and lamp assume relative positions and conditions similar to those above described and shown, but with the battery upside down, the fluid being prevented from escaping by the liquid-tight joints of the cover B, bush D, and electrode E.

In Fig. 4 the positive elements E are of cylindrical form. Fig. 10 shows such an element of prismatic form; but it is obvious that they may be made of any suitable form, according to circumstances. It will be obvious that this reversible battery may be arranged so as to consist of a single cell or of any required number of cells, according to circumstances, and that instead of being oblong in plan, as shown by Fig. 3, it may be circular, as shown in Figs. 11 or 12, or of any other suitable shape. Fig. 11 shows how a circular case may be arranged with two cells, and Fig. 12 how it may be arrranged with three cells, the letters of reference in those figures indicating parts corresponding with those marked with similar letters in Figs. 1, 2, 3, 4, and 5.

I claim—

1. The combination, in a reversible battery, of the cells, the cover B, extending over the cells, the interposed packing c, the headed bushing extending through the cover, the packing F between the said headed bushings and the cover, the shouldered zinc elements E, having screw-threaded stems projecting through the said bushings, the countersunk nuts $E^4$ on the said stems, the packing interposed between the said shoulder of the elements E and the cover, the nuts $E^5$ above the nuts $E^4$ for making the electrical connections, and the top G, extending over the cover B and held thereto, forming cavities for the bushings, substantially as described.

2. The combination, in a galvanic battery, of the cells, the elements E, extending into the same, the cover, the sealing means therefor, the elements I, and the frames J within the cells for holding the said elements I, substantially as described.

3. In a reversible galvanic battery, the cells, the liquid-tight case, the bushings, the handle, the slip-joint, and connection between the said handle and the case, including the locking means therefor, substantially as described.

4. In a reversible galvanic battery, the mechanism for locking the handle in position, whether the battery is being carried thereby in its normal or in its inverted position, the said mechanism consisting of plates S, secured to the sides of the battery and having slots T, recesses U and projections V V′ formed therein, pins W, of square or other suitable section, taking into correspondingly-shaped holes in the ends of the handle R and having cylindrical parts $W^2$ passing through the slots T in the plates S and having riveted on their inner ends washers $W^4$, which take into the recesses U and each having a notch $W^5$ formed therein to engage with one or other of the projections V V′, combined, arranged, and operating substantially as hereinbefore described, and illustrated in the drawings.

In testimony that I claim the foregoing as my invention I have signed my name in presence of two subscribing witnesses.

WILLIAM JOHN ENGLEDUE.

Witnesses:
 W. H. BECK,
  115 *Cannon Street, London.*
 W. A. SMITH,
  73 *Sydner Road, London, N.*